W. Z. W. CHAPMAN.
Carriage-Curtain Fastenings.

No. 156,724. Patented Nov. 10, 1874.

Attest:
Wm. H. Finckel
Alonzo Hughes

Inventor:
Wm. Z. W. Chapman
per G. M. Plympton,
Atty.

UNITED STATES PATENT OFFICE.

WILLIAM Z. W. CHAPMAN, OF NEW YORK, N. Y.

IMPROVEMENT IN CARRIAGE-CURTAIN FASTENINGS.

Specification forming part of Letters Patent No. 156,724, dated November 10, 1874; application filed June 21, 1872.

*To all whom it may concern:*

Be it known that I, WILLIAM Z. W. CHAPMAN, of the city, county, and State of New York, have invented certain new and useful Improvements in Fastenings for Carriage-Curtains and other purposes; and that the following is a full, clear, and exact description of the same, referring to the accompanying drawings for illustration.

The invention consists of a device for securing or fastening carriage-curtains, constructed and arranged as hereinafter described and claimed.

Figure 1:
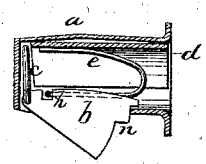
Figure 2:
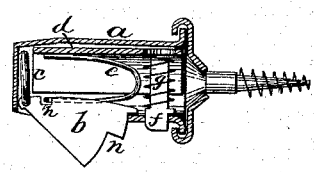
Figure 3:
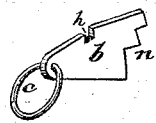
Figure 4:
Figure 5:
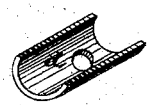
Figure 6:
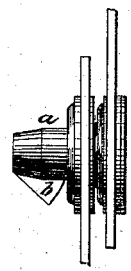

In the accompanying drawings, Figure 1 is a longitudinal section of fastener, showing the cap, ring, spring, and stop-plate. Fig. 2 is a similar view, showing catch, ring, spring, elastic bearing, spiral spring, stop-plate, and attaching-screw. Fig. 3 is a perspective view of the catch and ring detached. Fig. 4 is a similar view of the spring; Fig. 5, also a like view of stop-plate; and Fig. 6, a side view, showing the application of my fastener.

The construction is as follows: I form a cylindrical or other shaped cap, $a$, of metal or other suitable material, slightly tapering toward the top, which is closed, and having a flange at its lower end. A slot is made through one side of this cap $a$, through which the catch $b$ projects. Into this cap I slide the catch-piece $b$, having a ring of wire, $c$, that is fitted within the cap, strung through a hole at its upper end, in this way making the hinge-joint, as clearly indicated. The ring $c$ is kept in place by a curved stop-plate, $d$, which is inserted into the cap $a$ until its upper end presses snugly against the ring $c$; or the same may be soldered to the interior of the fastener. Into the cap $a$ is next inserted a metallic or any other suitable spring, $e$, in such manner as to project the catch $b$ outward, excepting when it is pressed in, when being used, or in fastening or unfastening. The lower end of the catch $b$ is projected slightly downward, so that the projection will be forced out with the catch, and exert an elastic pressure on the grommet of the curtain, which rests against the bearing $n$ formed in the said catch, and thus prevent rattling; and when the fastener is intended to hold two curtains, a small bearing, $f$, is inserted in a slot formed in the cap immediately below the catch $b$, so as to afford an elastic bearing similar to the projection of the catch $b$, and thus avoid rattling; or the elastic bearing may be pivoted so as to vibrate in the slot. This bearing is kept in position by a small spiral or other spring, $g$, one end of said spring entering into a hole, or resting over a small teat formed in the stop-plate, thus holding it in place. The catch $b$ is formed on its inner edge with a small notch or seat, $h$, into which one end of the spring rests, so that when the catch is pressed inward the spring will not only be pressed together, but it will be somewhat shortened, and thus increase its elastic force.

When the several parts are inserted into the interior of the cap I apply to the base or open end of the cap a common wood-screw, having a metal cup-shaped washer around it, which covers the flange or cap $a$, when, by a tool, said washer is firmly set down upon said flange; or the screw-head may be corrugated, and like corrugations be formed in the cup-shaped washer, so that when the screw is placed within it, a small disk placed over the top of the screw will hold it in place.

If it is desired to attach the fastener to a metal rail, or other metal foundation, the base of the fastener is provided with a tubular extension, having screw-threads cut therein, so that a screw passed through a hole drilled through the metallic foundation, and screwed into said projection, will hold the fastener firmly in place; or said projection may be passed through the hole of the rail, and the end spread, forming a rivet-head.

It will be best, in some instances, to make the base of the fastener concave, so that it will snugly fit around the rail or other foundation, or provide it with projections to enter into the rail for the purpose of preventing the fastener from becoming unscrewed.

I do not wish to limit myself to any particular way of forming the cap $a$; but it may be struck up from a radiated blank, or otherwise. Nor do I wish to limit myself to any particular shape, size, or mode of applying the catch $b$; but my invention relates to any curtain-fastener constructed substantially in the manner and for the purpose hereinbefore described.

I hereby disclaim any and all parts of the above-described carriage fastening device that have been heretofore patented by W. Z. W. Chapman and J. W. Chapman by Letters Patent of the United States, dated the 22d day of October, 1861, and numbered 2,511, whole number 33,515; but What I do claim as new, and desire to secure by Letters Patent, is—

1. The combination, in a carriage-curtain fastening, of the cap $a$, spring $e$, catch $b$, and curved plate $d$, said catch $b$ being made with a bearing, $n$, in the manner and for the purpose specified.

2. The spring-bearing $f$, in combination with a carriage-curtain fastening, constructed substantially as and for the purpose specified.

WM. Z. W. CHAPMAN.

Witnesses:
H. L. WATTENBERG,
G. M. PLYMPTON.